United States Patent [19]
Takahashi

[11] Patent Number: 5,396,437
[45] Date of Patent: Mar. 7, 1995

[54] MOTION DETECTION METHOD AND ITS APPARATUS

[75] Inventor: Toshiya Takahashi, Takatsuki, Japan

[73] Assignee: Matsushita Electric Industrial Co., Ld., Osaka, Japan

[21] Appl. No.: 797,072

[22] Filed: Nov. 25, 1991

[30] Foreign Application Priority Data

Nov. 26, 1990 [JP] Japan ................... 2-323605

[51] Int. Cl.⁶ .............................................. H04N 7/12
[52] U.S. Cl. ...................... 364/516; 382/56; 348/155; 348/409
[58] Field of Search ................... 358/105, 136; 382/56; 364/516

[56] References Cited

FOREIGN PATENT DOCUMENTS 0181215  5/1986  European Pat. Off. .

Primary Examiner—Emanuel T. Voeltz
Assistant Examiner—Craig Miller
Attorney, Agent, or Firm—Wenderoth, Lind & Ponack

[57] ABSTRACT

A motion detecting method and its apparatus are provided in which during a block matching procedure for detecting movement, error data in displacement between reference two-dimensional blocks and target two-dimensional blocks to be examined of a frame are calculated by a known manner and, in addition, a movement throughout the two-dimensional blocks is detected by summing up a series of the error data at each displacement point of the blocks and selecting the smallest of the error data sum.

3 Claims, 2 Drawing Sheets

MOTION DETECTION METHOD AND ITS APPARATUS

BACKGROUND OF THE INVENTION

1. Field of the Invention

The present invention relates to a method of detecting a movement of an object in a moving motion picture and to an apparatus for performing the method.

2. Description of the Prior Art

A method of detecting a movement of an object in a series of time consecutive motion pictures is commonly used for motion-compensated interframe coding in the technical field of motion picture coding.

One of the conventional motion detecting apparatuses will be explained referring to the drawings.

FIG. 5 is a block diagram of a conventional motion detecting apparatus employing the known block matching method. FIG. 6 is an explanatory diagram showing this motion detecting method. Provided in the apparatus of FIG. 5 are a buffer memory 1, an error calculating circuit 2, an error comparing circuit 3, and an address generating circuit 4. In FIG. 6, the numeral 61 represents a two-dimensional block in a t-th frame picture, 62 is a block in a (t−1)th frame picture for which errors from the block 61 are calculated, and 63 is a motion vector calculated by motion detection.

It is assumed that the t-th frame is a reference frame and a motion vector between the (t−1)th frame and the t-th frame is calculated for each two-dimensional block formed of m×n pixels. The picture data of each frame are first stored into the buffer memory 1 and then read out on a block by block basis. The two-dimensional block 61 shown in FIG. 6 is a reference block in the t-th frame having a center coordinate point S(x,y,t) and its displacement from the (t−1)th frame is calculated. The buffer memory 1 stores the picture data of the (t−1)th frame as well as the picture data of the t-th frame. First, data of a two-dimensional block having a center coordinate point (x,y,t−1) is retrieved from the memory 1. Then, the error calculating circuit 2 calculates a sum of the square errors between the picture data amplitudes of the two blocks as expressed by:

$$\sigma 0(0,0) = \sum_{y'=-n}^{n} \sum_{x'=-m}^{m} (S(x + x', y + y', t) - S(x + x', y + y', t - 1))^2$$

and transmits the result to the error comparing circuit 3. Then, the address generating circuit 4 produces an address signal for a succeeding block shifted by one horizontal pixel from the reference block in the (t−1)th frame and having a center coordinate point S(x+1, y, t−1). Also, the error calculating circuit 2 calculates $\sigma 0(+1,0)$ and transmits it to the error comparing circuit 3. The error comparing circuit 3 then compares $\sigma 0(0,0)$ and $\sigma 0(+1,0)$ and selects a smaller of the two. Each sum of errors $\sigma 0(xh,yv)$ are calculated in the same manner as above in the range of -h<xh<h and -v<yv<v. These operations calculate differences between the reference block in the t-th frame and the J blocks in the (t−1)th frame having the center coordinate points within an area (-h<xh<h, -v<yv<v) shown by the dotted line in FIG. 6. The error comparing circuit 3 selects a smallest $\sigma 0(mx,my)$ from among $\sigma 0(xh,yv)$ and outputs an address (mx,my). Hence, the motion vector 63 of S(x,y,t) is expressed by mv(mx,my). Similarly, the motion vectors of the other blocks in the t-th frame can be calculated by repeating the foregoing operations. (For example, see "Digital pictures" by Natravali, Haskell, PLENUM 1988, pp. 334–340.)

Such a conventional motion detecting apparatus can detect the movement of an object in each block of a picture but fails to detect a movement of the entire picture. The movement of the entire picture may be calculated by averaging the motion vectors of all blocks. However, the averaged motion vector is inaccurate when there are many detected vectors which mismatch with the real motion of the object or when the magnitude of the mismatching is large. Also, there is no theoretical solution for accurately processing the round caused due to averaging calculation.

SUMMARY OF THE INVENTION

It is an object of the present invention to provide a method of detecting a movement of an entire picture such as panning movement with a high accuracy, and an apparatus for performing the method.

For achievement of the object of the present invention, an improved method comprises the steps of: calculating errors $\sigma k(xh,yh)$ for K two-dimensional consecutive blocks in an area of (-h<hx<h, -v<yv<v), where $1 \leq k \leq K$, using a known technique; and summing up the errors $\sigma k(xh,yv)$ of the K blocks to obtain an error sum $\sigma(xh,yv)$ which is expressed by, $$\sigma(xh,yv) = \sum_{k=1}^{K} \sigma k(xh,yv)$$

where -h<xh<h and -v<yv<v, so that a movement of the area can be detected from the error sum.

Accordingly, in this motion detecting method, a motion vector of a whole picture can be obtained by summing up the errors generated through calculation of motion vectors of the blocks. More specifically, a movement of a part or entirely of a picture as well as local movements of the blocks can be detected accurately by adding a simple circuit to a conventional motion detecting apparatus.

DESCRIPTION OF THE PREFERRED EMBODIMENTS

Preferred embodiments of the present invention will be described in the form of a motion detecting method and its apparatus referring to the accompanying drawings.

Figure 1:
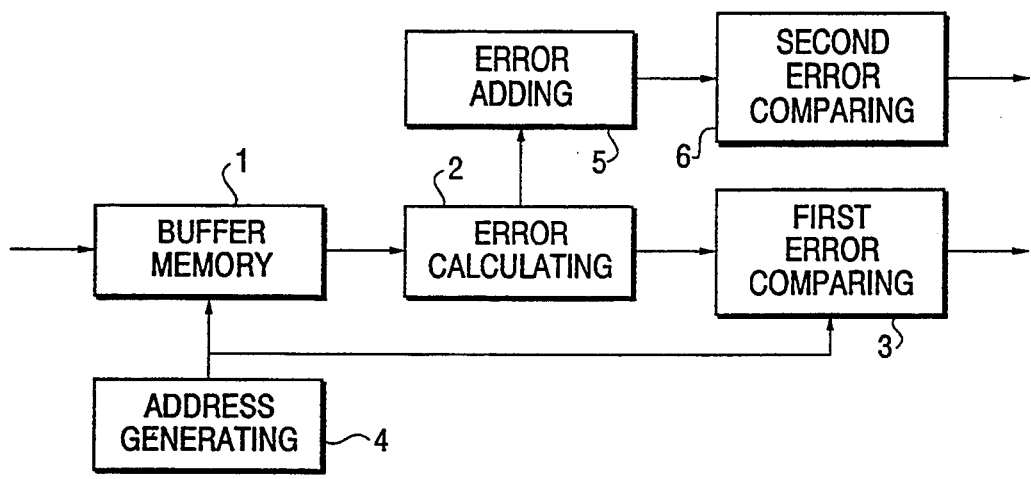
FIG. 1 is a block diagram of a motion detecting apparatus showing a first embodiment of the present invention.
Figure 2:
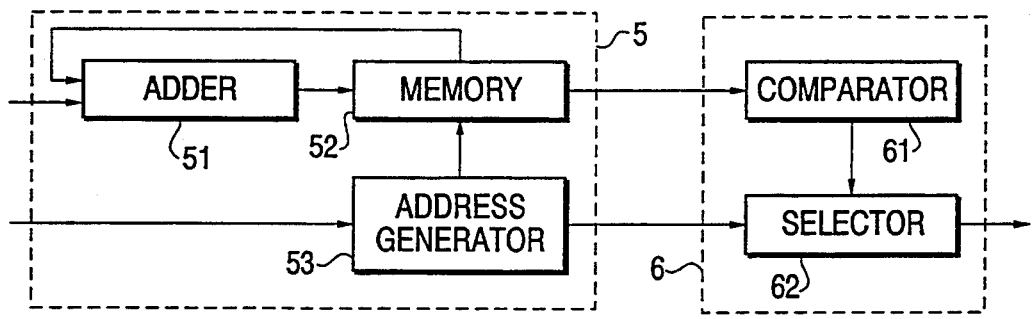
FIG. 2 is a block diagram showing an error adding circuit and a second error comparing circuit of the apparatus.

FIG. 1 is a block diagram of a motion vector detecting apparatus showing a first embodiment of the present invention. As shown in FIG. 1, there are provided a buffer memory 1, an error calculating circuit 2, an error comparing circuit 3, and an address generating circuit 4 which are arranged in the same manner as in the prior art. The error calculating circuit 2 may be a square error calculating circuit like that of the prior art or an absolute value calculating circuit. Also, provided are an error adding circuit 5 and a second error adding circuit 6 which both are illustrated in more detail in FIG. 2. The error adding circuit 5 comprises an adder 51, a memory 52, and an address generator circuit 53. The error comparing circuit 6 comprises a comparator 61 and a selector 62. The operation of the motion detecting apparatus having the foregoing arrangement will now be explained referring to FIGS. 1 and 2.

As is apparent from FIG. 1, the motion vector of each block of a picture can be detected in the same manner as in the prior art. In addition, the apparatus of the present invention contains the error adding circuit 5 and the second error comparing circuit 6 for detection of the overall movement throughout the picture.

It is assumed that the movements throughout a t-th frame and a t'-th frame are to be detected. Like the prior art, the center coordinate point of a reference two-dimensional block of the t-th frame is denoted by Sk(x,y,t). While the center coordinate point Sk(x,y,t') of a like block of the t'-th frame is displaced by ±h pixels in the horizontal direction and ±v pixels in the vertical direction, and its error $\sigma k(xh,yv)$ (where -h<xh<h and -v<yv<v) from the reference block is calculated by the error calculating circuit 2.

Then, the error $\sigma k(xh,yv)$ is fed to the error adding circuit 5 where it is added to an error data sum $\sigma(xh,yv)$ given by summing errors from 0 to k−1 and stored in the memory 52. As a result, the error data sum $\sigma(xh,yv)$ from 0 to k is obtained. Then, the memory 52 fetches this error data sum $\sigma(xh,yv)$ for updating. The address generator circuit 53 produces an address signal for supplying to the memory 52 in synchronism with the operation of the address generating circuit 4. When the total number of two-dimensional blocks of a frame is K, the error data sum $\sigma(xh,yv)$ (where -h<xh<h and -v<yv<v) for the all blocks of the frame is calculated by repeating the foregoing operation K times for the 1st to the K-th block, as expressed as a function of xh and yh:

$$\sigma(xh,yv) = \sum_{k=1}^{K} \sigma k(xh,yv)$$

The error data sum $\sigma(xh,yv)$ is transferred to the second error comparing circuit 6 where the smallest error $\sigma(mxt,myt)$ from among $\sigma(xh,yv)$ (where -h<xh<h and -v<yv<v) is selected with the comparator 61 and subsequently, the selector 62 delivers an address (mxt,myt). Hence, the motion vector of movement throughout the t-th frame is obtained as mv(mxt,myt).

As set forth above, the error data sum $\sigma(xh,yv)$ as a function of xh,yv is equivalent to the error generated when the motion detection is performed by the conventional method for the entire frame as one single block. Thus, the first embodiment allows the movement throughout the frame of a picture to be detected with accuracy.

Figure 3:
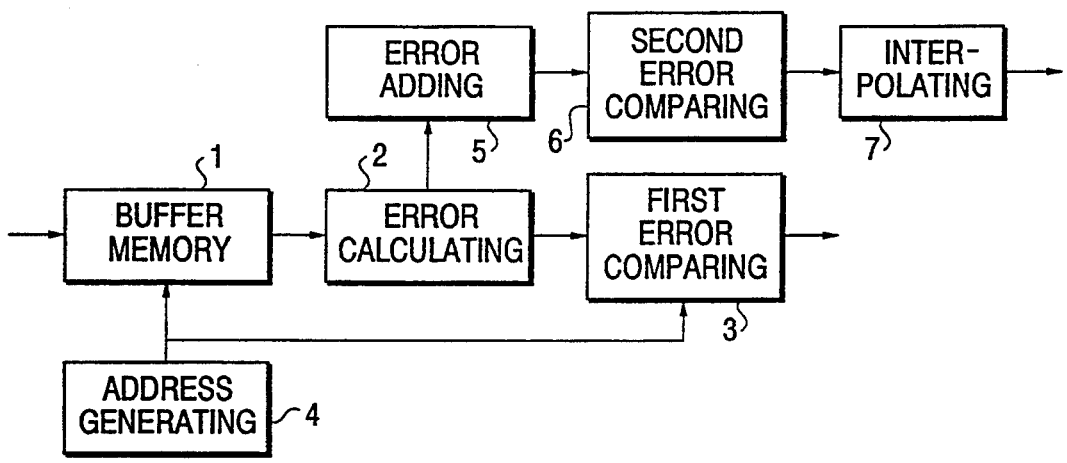
FIG. 3 is a block diagram of another motion detecting apparatus showing a second embodiment of the present invention.

FIG. 3 is a block diagram of another motion vector detecting apparatus showing a second embodiment of the present invention, which contains an interpolating circuit 7 unlike the first embodiment. The operation of the motion vector detecting apparatus of the second embodiment will now be explained referring to FIGS. 3 and 4.

Figure 4:
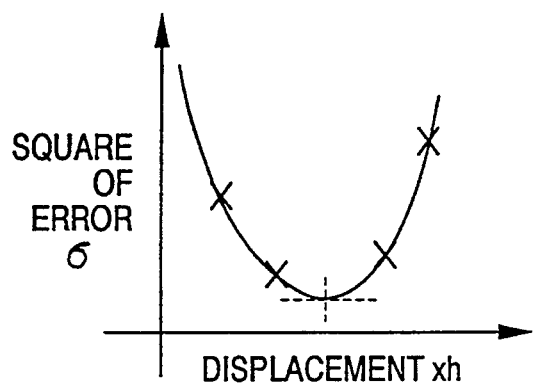
FIG. 4 is an explanatory view showing an interpolation method of the second embodiment.
Figure 5:
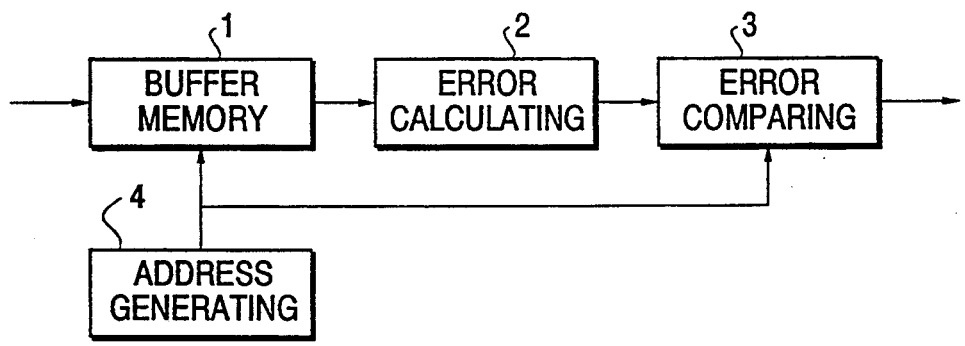
FIG. 5 is a block diagram of a conventional motion detecting apparatus.
Figure 6:
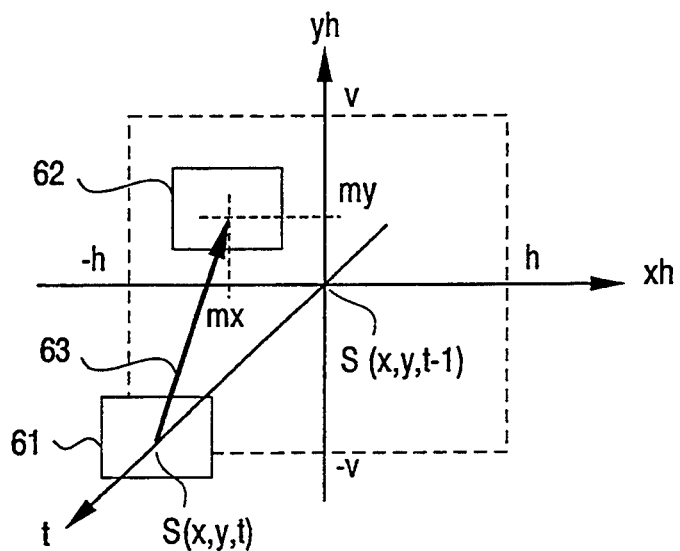
FIG. 6 is an explanatory view showing a conventional motion detecting method.

FIG. 4 is an explanatory diagram showing a technique of calculating a motion vector through interpolation, in which the X axis denotes the displacement xh in the horizontal direction and the Y axis represents the error $\sigma$. The squares of errors detected fall on their respective points x. The graph of FIG. 4 exhibits no vertical displacement for ease of explanation. Although the smallest error data is regarded as a motion vector in the first embodiment, it is more accurate to calculate the motion vector as follows: (1) Select b number of smallest squared errors from among $\sigma(xh,yv)$. (2) Interpolate more quantities between them. (3) Select the minimum value as the motion vector. FIG. 4 shows a parabola in which the minimum value represents a motion vector of the displacement throughout the frame. The interpolation may also be carried out by a common technique using e.g. Newton's difference division formula, Lagrange's interpolation formula, Gregory-Newton interpolation formula, Newton-Gauss interpolation formula, or Stirling's interpolation formula. In practice, the interpolation is conducted at the interpolating circuit 7 coupled to the output of the second error comparing circuit 6 as shown in FIG. 3. The second error-comparing circuit 6 performs the operation described in the first embodiment and also, delivers the b number of smallest errors to the interpolating circuit 7.

Although the motion vector of displacement throughout a frame picture is calculated in the foregoing embodiments, it may be detected across any portion of the picture. For example, a motion vector for a quarter of the picture can be calculated without change of the arrangement of the present invention.

Although error data between two adjacent blocks are summed up in the embodiments, they may be calculated from any groups of blocks. For example, a group of blocks of which motion vector magnitudes are approximately equivalent can be extracted and examined for detecting the movement throughout the blocks extracted as above without departing the spirit of the present invention.

The present invention is not limited to the second embodiment in which no vertical movement is involved as assumed for ease of description. A motion vector of displacement throughout the picture may be calculated from the lowermost point of an interpolated curve which extends on a two-dimensional space with both vertical and horizontal movements accounted respectively or using a parameter of their combination movement.

What is claimed is:

1. A data processing apparatus for detecting a picture movement within motion picture data composed of plural frames of pixel data for respective successive points in time, said data processing apparatus comprising:
   a memory buffer having an input receiving said motion picture data;
   an error calculating circuit, operatively coupled to said buffer memory, for (a) retrieving from said memory buffer a kth reference block having a center coordinate point Sk from among K two-dimensional blocks contained within a frame of pixel data for a time t, each of said K two-dimensional blocks composed of m by n pixels, where K, k, m and n are positive integers and $1 \leq k \leq K$, (b) retrieving from said memory buffer J two-dimensional blocks having a center coordinate point Sj contained within a corresponding frame of pixel data for a time t' which is discrete from said time t, each of said J two-dimensional blocks composed of m by n pixels, where J is a positive integer, and (c) calculating J predefined errors $\sigma k(j)$ between the kth reference block and each of the respective J two-dimensional blocks;

a first comparator circuit, operatively coupled to said error calculation circuit, for comparing each of the calculated J predefined errors $\sigma k(j)$ with each other and for generating data indicative of a detected movement of the kth reference block in accordance the compared J predefined errors $\sigma k(j)$;

an adding circuit, operatively coupled to said error calculating circuit, for summing the J predefined errors $\sigma k(j)$ associated with each of the K two-dimensional blocks to obtain K error data sums $\sigma(j)$;

a memory, operatively coupled to said adding circuit, for storing said K error data sums $\sigma(j)$; and, a second comparator circuit, operatively coupled to said memory, for comparing each of the stored K error data sums $\sigma(j)$ with each other and for generating data indicative of a detected overall movement of the K two-dimensional blocks in accordance with the compared K error data sums $\sigma(j)$.

2. An apparatus as claimed in claim 1, wherein said second comparator circuit includes means for selecting a minimum one of said K error data sums $\sigma(j)$ as representative of the overall movement of the K two-dimensional blocks.

3. An apparatus as claimed in claim 1, wherein said second comparator circuit includes means for selecting a of said K error data sums $\sigma(j)$ having a smallest value, where a is an integer greater than one, and wherein said apparatus further comprises an interpolating circuit for interpolating the selected a error data sums $\sigma(j)$, wherein the interpolated result is representative of the overall movement of the K two-dimensional blocks.

* * * * *